United States Patent [19]

Kollar

[11] 4,050,090
[45] Sept. 20, 1977

[54] HELICAL SCAN MAGNETIC RECORDING DEVICE HAVING A FOLDED MOUNTING PLATE

[75] Inventor: Ernest P. Kollar, Longmont, Colo.

[73] Assignee: International Business Machines Corporation, Armonk, N.Y.

[21] Appl. No.: 613,753

[22] Filed: Sept. 16, 1975

[51] Int. Cl.² .......................... G11B 5/52; G11B 5/78; G11B 19/00
[52] U.S. Cl. .................................... 360/130; 242/180; 360/84
[58] Field of Search .......................... 360/130, 84, 71; 242/189, 180, 76

[56] References Cited
U.S. PATENT DOCUMENTS

| | | | |
|---|---|---|---|
| 2,773,120 | 12/1956 | Masterson | 360/71 |
| 3,679,840 | 7/1972 | Maxey | 360/130 |
| 3,691,315 | 9/1972 | Ellmore | 360/84 |
| 3,864,739 | 2/1975 | Jackson | 360/71 |

Primary Examiner—Alfred H. Eddleman

[57] ABSTRACT

A helical scan magnetic recording device is provided with a folded mounting plate in order to permit a tape wrap on the circumference of a tape support mandrel which is intermediate the conventional 180° and 360° tape wraps. Specifically, the device is provided with a folded mounting plate comprising a body having a substantially planar reference surface for supporting a tape entry guide and a non-parallel, substantially planar exit reference surface for supporting a tape exit guide. The two non-parallel surfaces are coupled together to define a V-block mounting support for the mandrel. In a preferred embodiment, the entry reference surface and the exit reference surface are each perpendicular to the directions of tape entry onto the mandrel and tape exit off the mandrel, respectively. In addition to permitting the use of intermediate tape wrap angles, this device provides a more efficient and compact structure and permits more precise mounting of critical device components.

7 Claims, 2 Drawing Figures

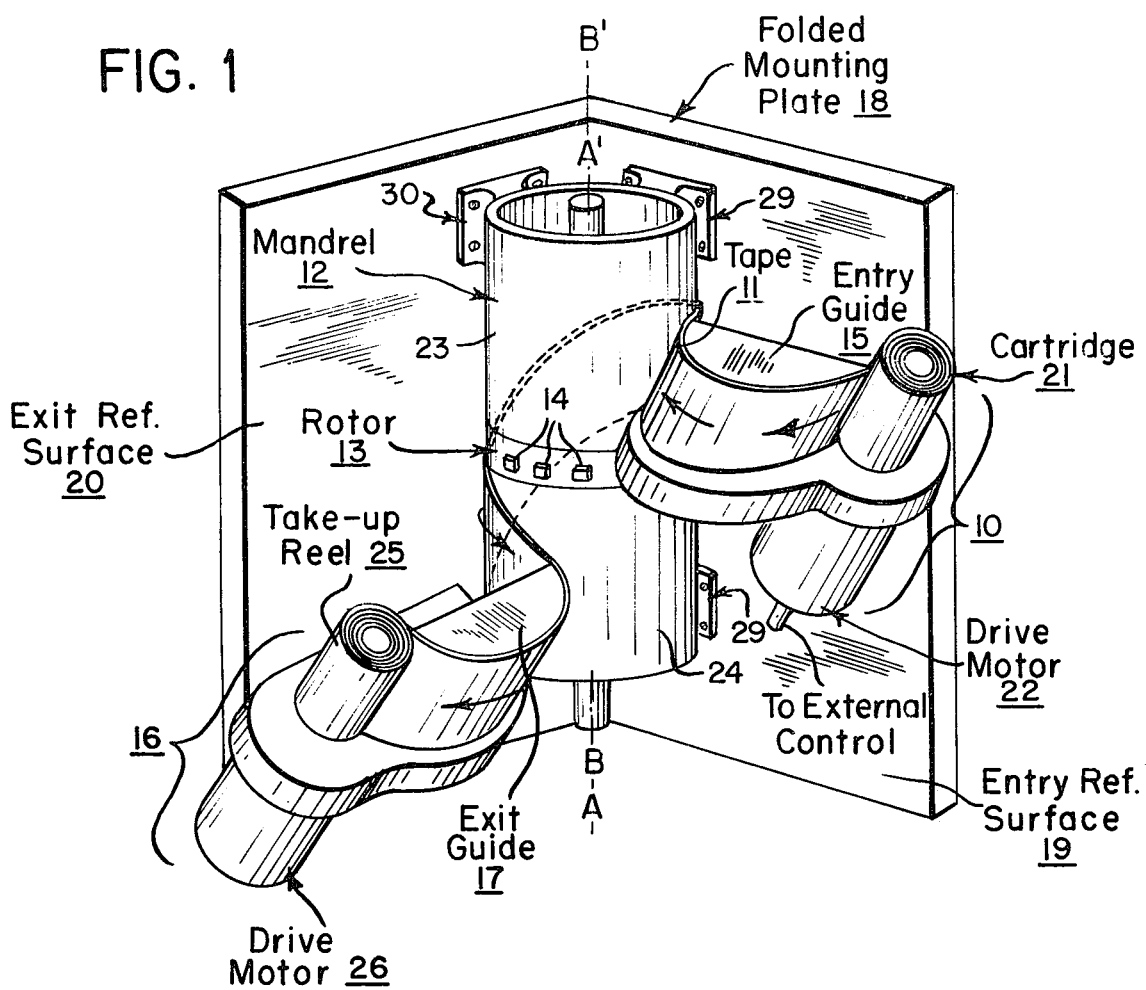
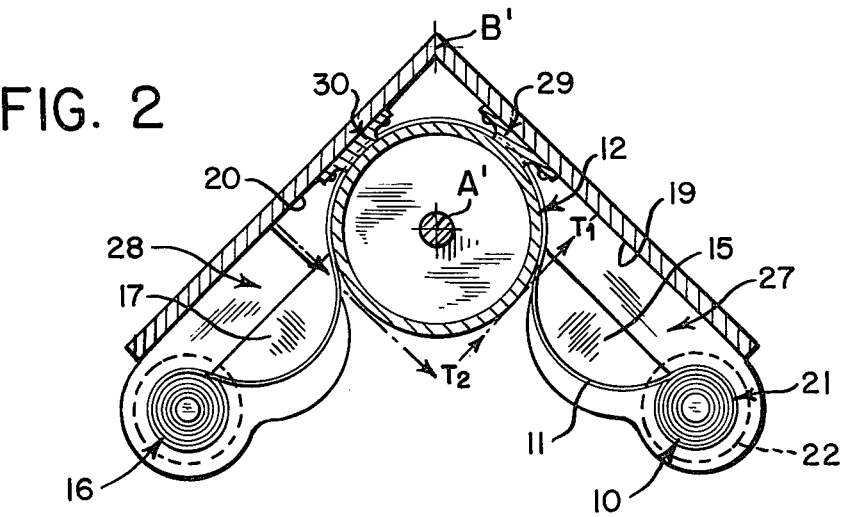

HELICAL SCAN MAGNETIC RECORDING DEVICE HAVING A FOLDED MOUNTING PLATE

BACKGROUND OF THE INVENTION

1. Field of the Invention

This invention relates to an improved helical scan magnetic recording device. More particularly, it relates to a helical scan magnetic recording device having a folded mounting plate in order to permit a tape wrap on the circumference of a tape support mandrel which is intermediate the conventional 180° and 360° tape wraps.

2. History of the Art

The desirability of recording and replaying high speed information signals from television and from high speed digital computers has resulted in increasingly sophisticated magnetic recording devices. Conventional longitudinal scan magnetic recording devices are adequate to record and replay relatively low frequency signals in the audio range. But such devices are not adequate for recording information signals in the video frequency range because it is not practical to drive them to high linear tape speeds required for use at such frequencies.

As disclosed in U.S. Pat. No. 2,773,120 issued to E. E. Masterson, helical scan magnetic recording devices overcome the necessity for high linear tape speeds. A typical helical scan device comprises a relatively wide magnetic tape, a pair of cylindrical support mandrels, a rotor, and a magnetic head (recording or replaying) disposed upon the rotor. The mandrels are axially aligned and positioned end-to-end with a slight gap between them, and the rotor is aligned on the common mandrel axis to rotate in the gap between the two mandrels. In operation, the wide magnetic tape is wrapped helically about the support mandrels with its edges abutted across the gap between the cylinders, and the rotor carries the magnetic head around the gap to scan a diagonal track on the tape. In such a device, the rotor speed can greatly exceed the tape speed, thereby permitting greatly increased scanning rates.

Conventional helical scan magnetic recording devices, however, are based upon a limited conception of mounting arrangements which result in relatively cumbersome and inefficient diveces. Typical conventional devices utilize a tape wrap of substantially 360° such as is described in the above-identified Masterson patent or substantially 180° such as is described in U.S. Pat. No. 3,691,315 issued to W. A. Ellmore.

The difficulties with the 360° wrap devices are manifold. First, because the tape is wrapped about 360° of the mandrel circumference, the magnetic heads carried on the rotor mechanically interact with the tape throughout the 360° rotation of the rotor about the mandrel axis. Such a device precludes practical arangements for gradually increasing and decreasing the head penetration into the region normally occupied by the tape. Second, the 360° wrap device is relatively inefficient in the only about 270° of the tape track is actually available for reading or writing by a circular rotor due to deviation of the winding from a circular shape to a helicoidal shape. Consequently, the region of the tape which is worn by the moving head (i. e., 360°) considerably exceeds the portion which can be accessed (270°). Third, the 360° tape wrap device is not readily adaptable to the use of multiple heads. Multiple heads would merely track one another in such a device.

The 180° wrap devices also suffer from significant limitations. While such devices do permit gradual head penetration of the tape, they do so at the expense of a considerable proportion of the potentially usable tape track. The maximum length of each available track is necessarily less than 180° by at least required stabilization zones for entry and exit, and these stabilization zones constitute a relatively large proportion of the short 180° track.

In addition, both conventional devices use relatively cumbersome mounting arrangements. Both mounting arrangements are essentially planar in nature and therefore relatively elongated. Moreover, because they are planar (two-dimensional), they present difficulties in mounting the components with the required high levels of three-dimensional tolerance (typically in the mil or one-tenth mil range).

SUMMARY OF THE INVENTION

In accordance with the present invention, a helical scan magnetic recording device is provided with a folded mounting plate in order to permit a tape wrap on the circumference of a tape support mandrel which is intermediate the conventional 180° and 360° tape wraps. Specifically, the device is provided with a folded mounting plate comprising a body having a substantially planar reference surface for supporting a tape entry guide and a non-parallel, substantially planar exit reference surface for supporting a tape exit guide. The two non-parallel surfaces are coupled together to define a V-block mounting support for the mandrel. In a preferred embodiment, the entry reference surface and the exit reference surface are each perpendicular to the directions of tape entry onto the mandrel and tape exit off the mandrel, respectively. In addition to permitting the use of intermediate tape wrap angles, this device provides a more efficient and compact structure and permits more precise mounting of critical device components.

BRIEF DESCRIPTION OF THE DRAWING

The nature, advantages, and various features of the invention will appear more fully upon consideration of the illustrative embodiments now to be described in detail in connection with the accompanying drawing.

In the drawing:

FIG. 1 is a view of a helical scan recording device utilizing a folded mounting plate in accordance with the invention; and FIG. 2 is a view of a portion of the device of FIG. 1 showing a cross section.

For convenience of reference, the same reference numerals are used to designate the same elements throughout the drawing.

DETAILED DESCRIPTION OF THE DRAWING

Referring to the drawing, FIG. 1 illustrates an improved helical scan recording device employing a folded mounting plate in accordance with the invention. The device comprises, in substance, a source 10 of magnetic tape 11, a tape support mandrel 12 including a rotor 13 carrying one or more magnetic heads 14, and entry guide means 15 for guiding tape from the tape source 10 onto the madrel. Tape sink 16 is provided for receiving tape from the mandrel, and exit guide means 17 is provided for guiding the tape off the mandrel and into the tape sink. The entry guide means 15, the mandrel 12, and the exit guide means 17 are all mounted on a folded reference mounting plate 18 positioned on the side of the mandrel opposite from the entry and exit guides. The entry guide means is mounted on a first substantially planar surface of the mounting plate which may be referred to as the entry reference suface 19; the exit guide means is mounted on a second planar surface, which is not parallel to the first surface, termed the exit reference surface 20; and the mandrel is mounted on both of said surfaces in a V-block mounting configuration.

Tape source 10 typically comprises a motorized tape cartridge 21 driven by an externally controlled motor 22.

Entry and exit guide means 15 and 17, respectively, typically comprise bearing surfaces for directing the tape onto and off the mandrel 12 in directions substantially tangential to the mandrel surface. Such guide means may advantageously include skew correction means such as is described in applicant's now U.S. Pat. No. 3,943,566, and assigned to applicant's assignee. It may also include compliant guiding means for minimizing tension disturbances such as are described in U.S. Pat. No. 3,850,358 issued to M. L. Nettles.

Tape support mandrel 12 typically comprises a pair of cylindrical mandrel halves 23 and 24 aligned along a common axis AA'. Preferably, the mandrel halves are provided with an air bearing for supporting tape 11. This air bearing may be produced by forcing air through a porous or perforated mandrel surface, as described, for example, in U.S. Pat. No. 3,488,455 issued to Sashoua et al. Alternatively, the air bearing may be aerodynamically produced by rotating the mandrels as described, for example, in U.S. Pat. No. 3,333,753 issued to J. H. Streets. The rotor 13 is disposed between adjacent ends of the aligned mandrel halves and carries the magnetic heads 14, which can be separate read, write, and erase heads, in scanning adjacency to magnetic tape 11 supported on the mandrel. Tape sink 16 typically comprises a motorized take-up reel 25 driven by an externally controlled motor 26.

FIG. 2, which shows a cross section of the device illustrated in FIG. 1, provides a better illustration of the preferred mounting geometry. As shown in the FIGURE, the entry guide means 15 is mounted on the entry reference surface through attachment of base 27 to the surface. Similarly, the exit guide means is mounted on the exit reference surface through attachment of base 28 thereto. The tape support mandrel 12, in contrast, is simultaneously mounted on both surfaces through the attachment of bases 29 and 30.

The folded mounting plate 18 is illustrated as a single body defining the entry and exit reference surfaces. Alternatively, a pair of bodies can be used, each defining one of the two surfaces, and the two bodies can be coupled together as by a welded intersection.

In the preferred embodiment, the entry reference surface 19 is chosen to be substantially perpendicular to the direction $T_1$ at which entry guide means 15 feeds tape tangentially onto mandrel 12. Similarly, the exit reference surface 20 is chosen to be substantially perpendicular to the direction $T_2$ at which exit guide means 17 removes tape from the mandrel. When these conditions are met, the intersection of non-parallel planes 19 and 20 is along a line BB' which is substantially parallel to cylinder axis AA'.

As illustrated in both FIGS. 1 and 2, the preferred angle of tape wrap about the mandrel circumference is 270°, corresponding to a 90° angle of intersection between surfaces 19 and 20. Clearly, however, other intermediate angles between 180° and 360° can be used with equal facility. Moreover, substantially the same geometry pertains for such intermediate angles plus an integral number of complete wraps around the mandrel, as the displacement between the entry guide means and exit guide means is unaffected by the presence of one or more integral wraps.

Aside from the advantages provided by its improved structure, the device operates in substantially the same manner as conventional helical scan devices.

The advantages of this improved device over conventional 360° and 180° wrap devices are manifold. Unlike the conventional 360° wrap devices, the device of the invention permits gradual penetration and withdrawal of the magnetic heads into the tape region. Moreover, it obtains the maximum utilizable track, approximating 270°, without subjecting unused portions of the tape to needless wear. As compared to 180° devices, the device of the present invention obtains a longer track length and reduces the proportion of the useful track length required for entry and exit stabilization.

As compared to both types of conventional devices, the device of the invention is more compact and provides a superior mounting arrangement for the precise positioning of the mandrel. In contrast with conventional devices which mount the mandrel with respect to but a single reference plane, the present invention mounts the mandrel with repsect to a pair of non-parallel planes which can provide any desired degree of orthagonal support. Such a mounting arrangement permits superior levels of precision and reliability.

While the invention has been described in connection with a small number of specific embodiments, it is to be understood that these are merely illustrative of many other specific embodiments which also utilize the principles of the invention. Thus, numerous and varied devices can be made by those skilled in the art without departing from the spirit and scope of the present invention.

I claim:

1. In a helical scan magnetic recording device of the type comprising a source of magnetic tape, a mandrel having a cylinder axis for supporting a wrap of said tape about a portion of its periphery; entry guide means for guiding said tape from said tape source onto said mandrel, a rotor for carrying about said cylinder axis at least one magnetic head in scanning adjacency to said tape along a path which is slanted with respect to said tape, a tape sink for receiving tape from said mandrel, exit guide means for guiding said tape off said mandrel and into said tape sink; and mounting means for mounting said mandrel, entry guide means, and exit guide means in operative relationship, the improvement wherein:

said mounting means comprises a folded reference mounting plate having a substantially planar entry reference surface and also having a substantially planar exit reference surface which is non-parallel to said entry reference surface;

said entry guide means is mounted on said entry reference plane of said folded reference mounting plate;

said exit guide means is mounted on said exit reference plane of said folded reference mounting plate at a position for removing tape from a position on said mandrel displaced from the position of entry onto said mandrel displaced from the position of entry onto said mandrel by an angle intermediate 180° and 360°; and said mandrel is mounted on both said entry reference plane of said folded mounting surface and on said exit reference plane.

2. A device according to claim 1 further characterized in that:
said entry guide means guides said tape onto said mandrel at an entrance direction tangential to said mandrel;
said exit guide means guides said tape off said mandrel at an exit direction tangential to said mandrel;
said entry reference surface of said folded reference mounting plate is substantially perpendicular to said entrance direction tangential to said mandrel; and
said exit reference plane of said folded reference mounting plate is substantially perpendicular to said exit direction tangential to said mandrel.

3. A device according to claim 1 further characterized in that said entry reference surface of said folded reference mounting plate intersects said non-parallel exit reference surface of said folded reference mounting plate along line of intersection.

4. A device according to claim 3 further characterized in that said line of intersection is substantially parallel to said cylinder axis of said mandrel.

5. A device according to claim 1 further characterized in that said exit guide means is mounted on said exit reference plane of said folded reference mounting plate at a position for removing tape from a position on said mandrel displaced from the position of entry onto said mandrel by an angle substantially equal to 270°.

6. A device according to claim 1 further characterized in that said entry reference surface of said folded reference mounting plate intersects said exit reference surface of said folded reference mounting plate at an angle of about 90°.

7. A device according to claim 1 further characterized in that said folded reference mounting plate is positioned on the side of said mandrel opposite from said entry and exit guide means.

* * * * *